(12) United States Patent
Chappell

(10) Patent No.: US 10,387,589 B2
(45) Date of Patent: Aug. 20, 2019

(54) PREDICTIVE ENVIRONMENTAL MODELING SYSTEM

(71) Applicant: Mark A. Chappell, Vicksburg, MS (US)

(72) Inventor: Mark A. Chappell, Vicksburg, MS (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 325 days.

(21) Appl. No.: 15/273,611

(22) Filed: Sep. 22, 2016

(65) Prior Publication Data

US 2018/0081999 A1    Mar. 22, 2018

(51) Int. Cl.
*G06F 17/18* (2006.01)
*G06F 17/50* (2006.01)

(52) U.S. Cl.
CPC .......... *G06F 17/5009* (2013.01); *G06F 17/18* (2013.01); *G06F 2217/16* (2013.01)

(58) Field of Classification Search
None
See application file for complete search history.

(56) References Cited

PUBLICATIONS

Mayer et al,, Predicting Chronic Lethality of Chemicals to Fishes From Acute Toxicity Test Data: Concepts and Linear Regression Analysis, Sep. 20, 1993, Environmental Toxicology and Chemistry, vol. 13 No. 4, pp. 671-678 (Year: 1993).*
Emissions Modeling Framework (EMF) User's Guide, 2014, p. 1-86 (Year: 2014).*
Marc Houyoux, Introduction to the Emissions Modeling Framework, May 14, 2007, 16th Annual International Emissions Inventory Conference, p. 1-16 (Year: 2007).*
www.mysqltutorial.org, Creating Tables Using MySGL Create Table Statement, Jan. 24, 2013, p. 1-5 (Year: 2013).*
Matusevich et al., A Clustering Algorithm Merging MCMC and EM Methods Using SQL Queries, 2014 JMLR: Workshop and Conference Proceedings 36, p. 61-76 (Year: 2014).*
Martin Van den Berg et al., Toxic Equivalency Factors (TEFs) for PCBs, PCDDs, PCDFs for Humans and Wildlife, Dec. 1998, Environmental Health Perspectives, vol. 106, No. 12, p. 775-792 (Year: 1998).*

* cited by examiner

*Primary Examiner* — Saif A Alhija
*Assistant Examiner* — Michael Edward Cocchi
(74) *Attorney, Agent, or Firm* — Brian C. Jones

(57) ABSTRACT

The present invention is a computer apparatus for creating an environmental impact model. The apparatus includes emission objects representing single or compound emissions. These objects include emission properties and processing function for updating these properties, and a species impact model which represents the impact of an emission on a species. The model includes value pairs of a quantified species impact value linked to an emissions concentration value. A computer system includes the emission objects on a server, a data interface for receiving emission properties, and an instantiation processor for creating more objects. Extrapolation and update processors allow statistical extrapolation of value pairs and updating emission properties.

15 Claims, 6 Drawing Sheets

PREDICTIVE ENVIRONMENTAL MODELING SYSTEM

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

FIELD OF INVENTION

This invention relates to the field of data processing and more specifically to an apparatus for modeling the environmental effects of a chemical or chemical combination.

BACKGROUND OF THE INVENTION

The U.S. Environmental Protection Agency (EPA) and other regulatory agencies throughout the world are charged with developing emissions standards. Emissions standards are the legal requirements governing pollutants released into air and water, and set quantitative limits on the permissible amount of specific pollutants that may be released from specific sources over specific timeframes.

The EPA and its regulatory counterparts in other countries are required to evaluate scientific data to ensure that emission standards for all emissions types are consistent and based on specific data, such as the impact of the substances at varying concentration levels. Emissions standards seek to maintain concentration levels below a threshold at which species within an environment are affected. Accordingly, emissions standards must be based on scientific data as to the effect a particular emission will have on multiple species at given concentration levels. Available data is used to form a predictive environmental model as to the impact of emissions on species within an environment.

Emissions standards for newly regulated substances must be reasonable and consistent. Ideally, standards for newly regulated emissions are based on a precedent established for other substances to maintain levels of concentration that do not unacceptably impact species.

The EPA and other agencies utilize two primary types of studies in formulating emission standards. Fate studies, which determine how toxins move through the environment, and toxicity/species impact studies, which determine the impact of toxins on particular species at specific concentrations.

The EPA and other environmental regulatory agencies face significant problems in obtaining data to develop consistent emissions standards. First, it is particularly difficult to obtain species impact data for contaminants introduced into their environment. Accordingly, the EPA and other government agencies extensively use mathematical modelling in the absence of field data to determine assumed species impact rates. Second, obtaining species impact data is costly and time-consuming. The EPA cannot afford to test all emissions, and must rely on data from many sources, including studies performed by the regulated industries themselves.

Finally, environmental models are not designed to efficiently predict concentrations that will produce an approximately equivalent impact. These comparative concentration levels are critical for establishing uniform regulations as to the amount and rate at which substances can be emitted into these environments.

There is an unmet need for environmental modeling systems that can predict and compare the environmental impact of toxins and the acceptable emissions levels based on known environmental data.

There is also an unmet need for a system that can produce accurate models for comparison, regardless of the units in which concentration and rate of emission are expressed, and for which the range of uncertainty of the model can be readily identified.

There is a further unmet need in the scientific community for a cumulative repository of reliable and normalized emissions modeling data to preserve, access, share, and validate environmental impact data.

BRIEF SUMMARY OF THE INVENTION

One embodiment of the present invention is a computer apparatus for creating a comprehensive, predictive environmental impact model. The apparatus instantiates emission objects representing single or compound emissions. These objects track emission properties and include a processing function for simultaneously updating multiple singular or interdependent species impact models associated with an emission, in real time.

Each emissions object contains one or more species impact models which represent the impact of an emission on a species. The species impact model may be any data structure known in the art that can store value pairs of a quantified species impact value linked to an emissions concentration value. In other embodiments, extrapolation and update processors allow statistical extrapolation of value pairs and updating emission properties.

BRIEF DESCRIPTION OF SEVERAL VIEWS OF THE DRAWING(S)

TERMS OF ART

Figure 1:
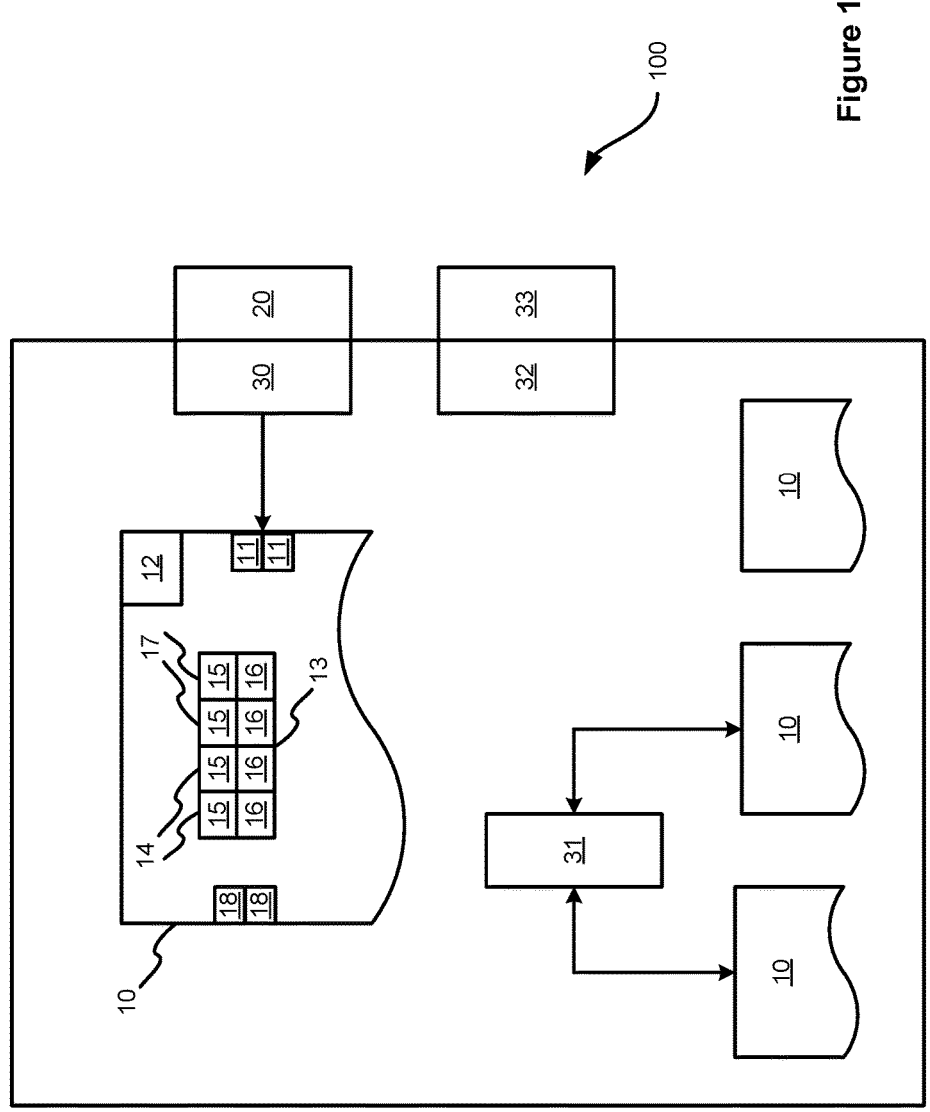
FIG. 1 illustrates an exemplary embodiment of a computer apparatus for creating a species impact model.

As used herein, the term "array" refers to any data structure known in the art which may be used to store an ordered arrangement of data.

As used herein, the term "configured" refers to software which physically causes a single computer processor to perform multiple processing functions concurrently to operate as multiple computers, or modified functionality and modified resource allocation (e.g., programmed with software or circuitry to perform an action).

As used herein, the term "data values" refers to values that express the condition, state or quantity of stored data or properties. Data values may include quantified species impact values (i.e. the percentage of a species affected by a given concentration) and emission concentration values (i.e. the concentration of an emission in an environment.)

As used herein, the term "function" refers to any set of computer instructions or segment of code that causes or modifies signals, circuitry, and resources to operate as a separate processing component.

As used herein, the term "interface" refers to a component receiving input data, sensed data, or retrieved data.

As used herein, the term "instantiate" refers to the fabrication of a data object or structure which may or may not have independent processing capability.

As used herein, the term "link" refers to a pointer, link, or path, or to assigning a common property, designation or identifying value.

As used herein, the term "model" refers to a data structure which tracks two or more levels or types of relationships between objects, tables, data structures, or functions.

As used herein, the term "native units" refers to units of measure in which data is received or acquired prior to conversion, modification, or translation.

As used herein, the term "predictive model" refers to a data structure which contains extrapolated data.

As used herein, the term "processor" refers to any code segment, circuitry or computer system or other apparatus capable of performing a logical, mathematical of functional operation and/or transforming the type, state, value or condition of an actual or modeled entity.

As used herein, the term "reliability" refers to a statistical level of expected accuracy.

As used herein, the term "sensitivity analysis type" refers to the type of analysis performed to determine sensitivity to variations in equations.

As used herein, the term "server" refers to a computer apparatus or system of processing components, circuitry, or software which is used to carry out storage and retrieval of data, data structures, and objects.

As used herein, the term "species impact" means any measurable and/or observable impact on a species, including but not limited to the natural development, reproduction, physical characteristics, growth, mortality, life span, resistance or any other characteristic of a species of plant or animal as a result of an alteration of the environmental in which the species is found.

As used herein, the term "static" refers to data or a state which does not change during a process or processing session. Static values may or may not be programmed as non-modifiable instructions or otherwise encoded into computer circuitry.

As used herein, the term "statistically extrapolated data pairs" refers to pairs of associated emissions concentration values and quantified species impact values, where the emissions concentration values are obtained using a statistical function.

As used herein, the term "update function" refers to a function which updates a data structure, value, property or instruction.

As used herein, the term "value pair" refers to data having a one to one relationship including, but not limited to, data values.

DETAILED DESCRIPTION OF THE INVENTION

FIG. 1 illustrates an exemplary embodiment of computer apparatus 100 for creating an environmental impact model. Computer apparatus 100 includes multiple emission objects 10. Each emission object 10 represents at least one emission type. In certain embodiments, emission object 10 may represent multiple emitted substances.

Each emission object 10 includes emission properties 11, as well as processing function 12 for updating emission properties 11. Each emission object 10 also includes a species impact model 13, which represents an impact of the quasi-unique emission on at least one species. In certain embodiments, species impact model 13 is an array. Species impact model 13 includes at least two value pairs 14. Each value pair 14 includes a quantified species impact value 15 linked to an emissions concentration value 16. Emissions concentration values 16 may be expressed in native measurement units.

In certain embodiments, processing function 12 also performs extrapolation function 300. Extrapolation function 300 populates species impact model 13 with at least one statistically extrapolated value pair 17.

Computer apparatus 100 may also include an interface 20 to receive new emission properties 11. Interface 20 is coupled with an update processor 30 to update multiple emission properties 11 in real time based on new emission properties 11. Update processor 30 may recursively update emission objects 10.

Computer apparatus 100 may also include a toxic equivalency model processor 31. Toxic equivalency model processor 31 identifies toxic equivalent values by extracting emissions concentration values 16 from two or more emissions data objects 20. Toxic equivalency model processor 31 can display emissions concentration values 16 in native units.

In certain embodiments, each emission object 10 includes at least one substance parameter value 18 used as a data key. Substance parameter value 18 may be a static quantified species impact value 15 or may be modified by a user. In certain embodiments, at least one quantified species impact value 15 of one emission object 10 is used as the data key to retrieve an equivalent emissions concentration value 16 from at least one other emission object 10.

Computer apparatus 100 may also include a reliability processor 32 configured to perform reliability function 400. Reliability function 400 represents the sensitivity of a function to changes in input variables. An input interface 33 of reliability processor 32 receives input such as a sensitivity analysis type input, a substance parameter data set P, and a sample number S.

Figure 2:
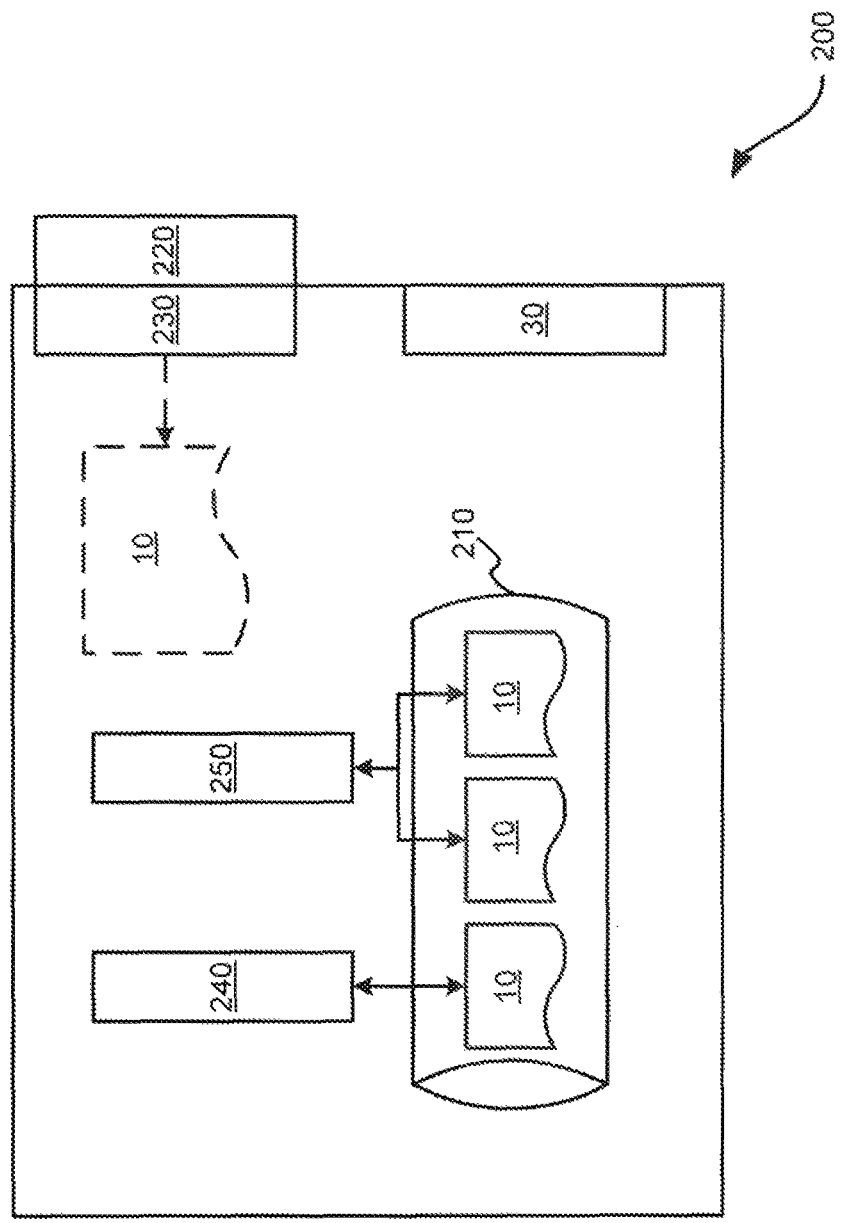
FIG. 2 illustrates an exemplary embodiment of a computer system for creating a species impact model.

FIG. 2 illustrates an exemplary embodiment of computer system 200 for creating an environmental impact model. A server 210 contains multiple emission objects 10. A data interface 220 receives emission properties 11. An instantiation processor 230 compares the input emission property value to emission properties 11 in emission objects 10. If emission properties 11 do not match, instantiation processor 230 instantiates a new emission object 10. Computer system 200 also includes an extrapolation processor 240 and update processor 30.

Computer system 200 may also include an environmental impact model processor 250 configured with instructions to retrieve emissions concentration values 16 from multiple species impact models 13. These species impact models 13 may be associated by identifying emission properties 11 within emission objects 10 based on user defined selection criteria. These criteria represent at least one emission property 11 of emission objects 10.

Figure 3:
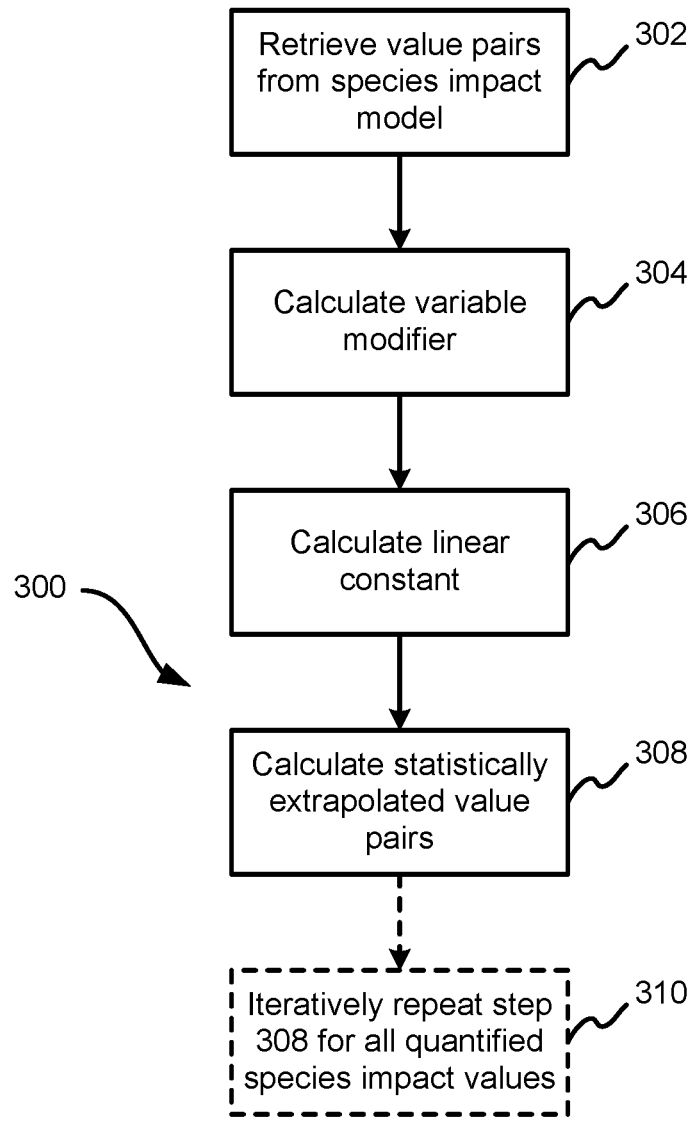
FIG. 3 is a flowchart illustrating an exemplary embodiment of an extrapolation function.

FIG. 3 is a flowchart illustrating an exemplary embodiment of extrapolation function 300.

In step 302, function 300 retrieves value pairs 14 from species impact model 13.

In step 304, function 300 calculates a variable modifier b using the equation $$b = \frac{\sum_{i=1}^{n} x_i y_i - n x_m y_m}{\sum_{i=1}^{n} x_i^2 - n x_m^2}$$

For this equation, n is the number of value pairs 14 from species impact model 13, $x_i$ is the quantified species impact value 15 of value pair 14 n, $y_i$ is the emissions concentration value 16 of value pair 14 n, $x_m$ is the mean quantified species impact value, and $y_m$ is the mean emissions concentration value.

In step 306, function 300 calculates a linear constant k using the equation $k = \bar{y} - b\bar{x}$;

In step 308, function 300 calculates at least one statistically extrapolated value pair 17 using the equation $y = bx + k$, For this equation, x is the quantified species impact value 15 of statistically extrapolated value pair 17, and y is the emissions concentration value 16 associated with x.

In optional step 310, function 300 iteratively repeats step 308 for all quantified species impact values 15 input by a user.

Figure 4:
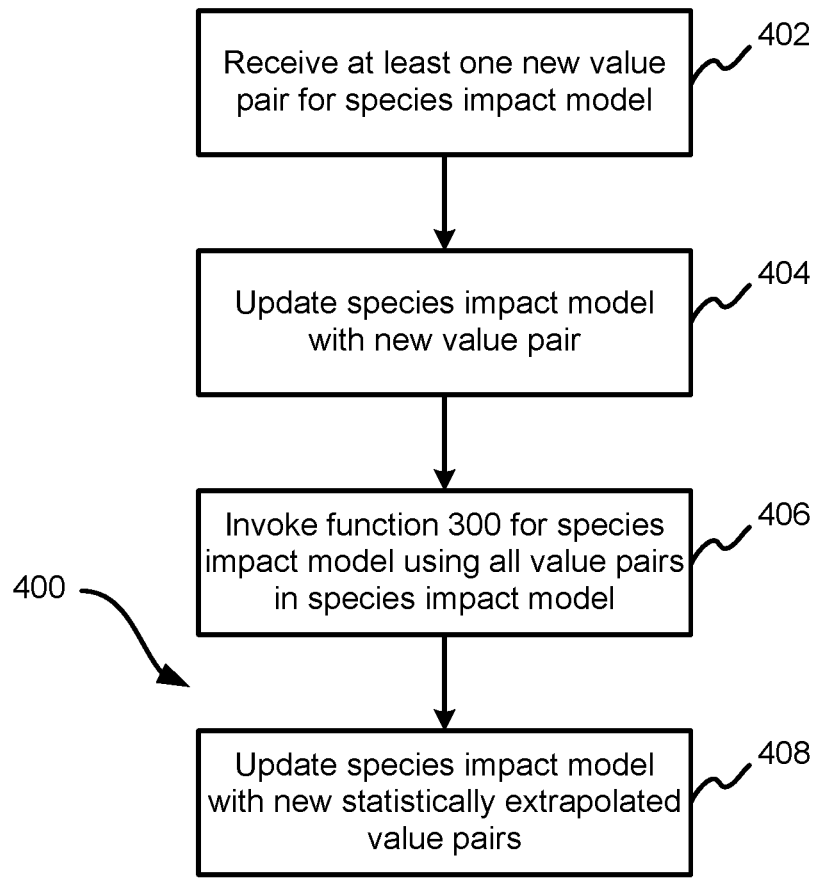
FIG. 4 is a flowchart illustrating an exemplary embodiment of an update function.

FIG. 4 is a flowchart illustrating an exemplary embodiment of update function 400.

In step 402, function 400 receives at least one new value pair 14 for species impact model 13.

In step 404, function 400 updates species impact model 13 with the new value pair 14.

In step 406, function 400 invokes function 300 for species impact model 13 using value pairs 14, in embodiments of the invention every value pair 14, in species impact model 13 to calculate new statistically extrapolated value pairs 17.

In step 408, function 400 updates species impact model 13 with the new statistically extrapolated value pairs 17.

Figure 5:
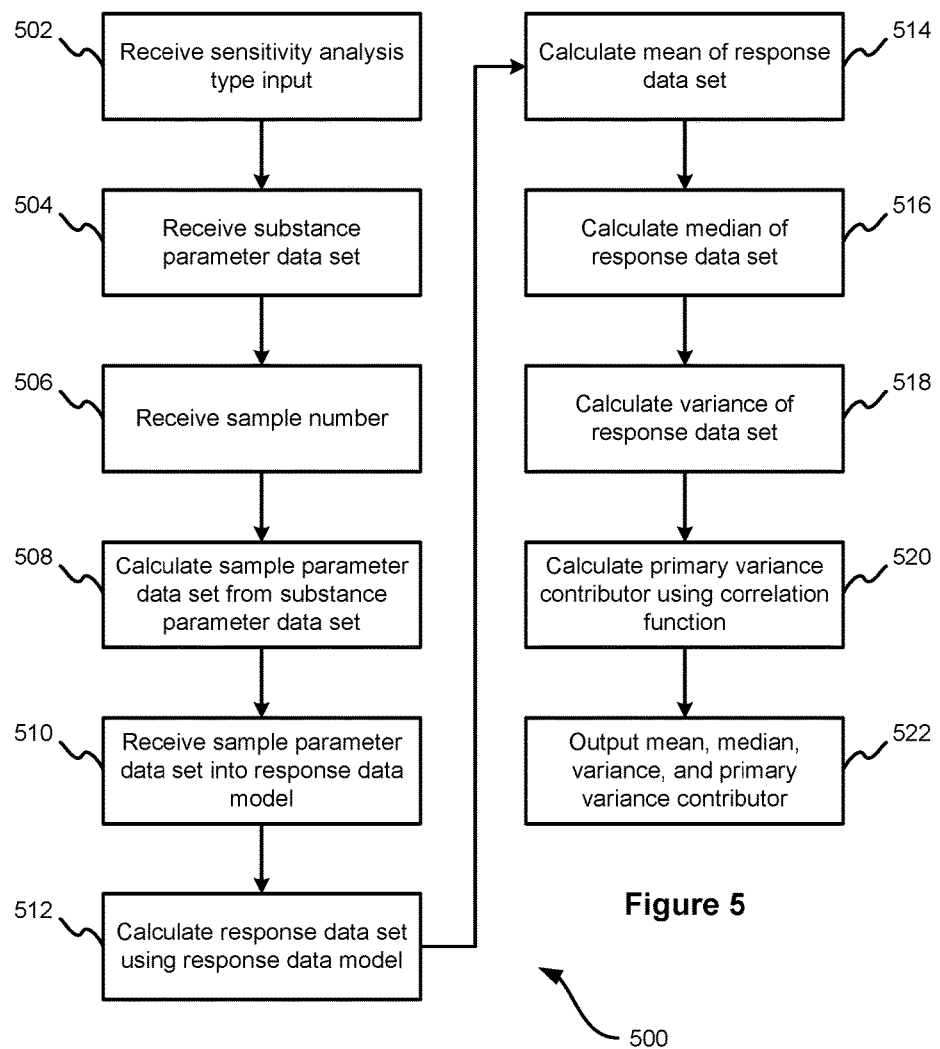
FIG. 5 is a flowchart illustrating an exemplary embodiment of a reliability function.

FIG. 5 is a flowchart illustrating an exemplary embodiment of reliability function 500.

In step 502, function 500 receives a sensitivity analysis type input. The sensitivity analysis type input is selected from the group consisting of: a patch variation function and a one-at-a-time variation function.

In step 504, function 500 receives a substance parameter data set P. The substance parameter data set P includes at least one parameter mean selected from the group consisting of: molecular weight, enthalpy of vaporization, enthalpy of solution, vapor pressure, water-octanol partition ratio, melting point, first-order reaction rate constant for substance with hydroxide radicals in air, first-order degradation constant for substance in water, area of freshwater, and concentration. The substance parameter data set P also includes at least one variation interval selected from the group consisting of: standard error of the parameter mean, standard deviation, and 95% confidence interval.

In step 506, function 500 receives a sample number S.

In step 508, function 500 calculates a sample parameter data set $Q_S$ from the substance parameter data set P using a Markov Chain Monte Carlo algorithm. The Markov Chain Monte Carlo algorithm calculates the sample parameter data set $Q_S$ using a distribution selected from the group consisting of: bounded uniform distribution, normal distribution, log-normal distribution, and log-logistic distribution.

In step 510, function 500 receives the sample parameter data set $Q_S$ into the response model.

In step 512, function 500 calculates a response data set $R_S$ using the response model.

In step 514, function 500 calculates a mean of the response data set $R_S$.

In step 516, function 500 calculates a median of the response data set $R_S$.

In step 518, function 500 calculates a variance of the response data set $R_S$.

In step 520, function 500 calculates a primary variance contributor from the response data set $R_S$ using a correlation function.

In step 522, function 500 outputs the mean, the median, the variance, and the primary variance contributor.

Figure 6:
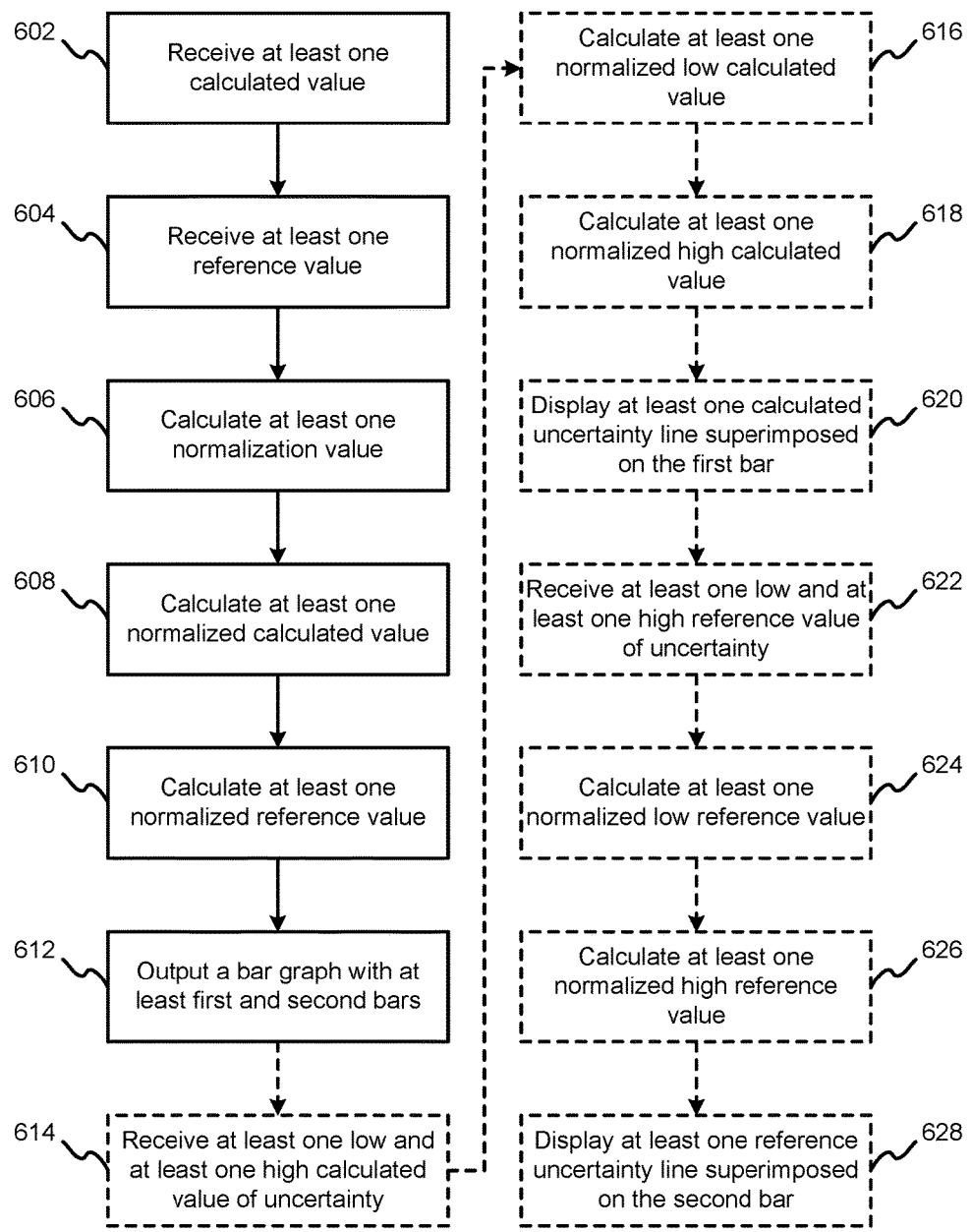
FIG. 6 is a flowchart illustrating an exemplary embodiment of a method for displaying normalized data.

FIG. 6 is a flowchart illustrating an exemplary embodiment of function 600 for displaying normalized data.

In step 602, function 600 receives at least one calculated value.

In step 604, function 600 receives at least one reference value.

In step 606, function 600 calculates at least one normalization value as equal to a highest value of the calculated value and the reference value.

In step 608, function 600 calculates at least one normalized calculated value by dividing the calculated value by the normalization value.

In step 610, function 600 calculates at least one normalized reference value by dividing the reference value by the normalization value.

In step 612, function 600 outputs a bar graph having at least one first bar representing the normalized calculated value and at least one second bar representing the normalized reference value.

In optional step 614, function 600 receives at least one low calculated value of uncertainty and at least one high calculated value of uncertainty.

In optional step 616, function 600 calculates at least one normalized low calculated value by dividing the low calculated value of uncertainty by the normalization value.

In optional step 618, function 600 calculates at least one normalized high calculated value by dividing the high calculated value of uncertainty by the normalization value.

In optional step 620, function 600 displays at least one calculated uncertainty line superimposed on the first bar. The calculated uncertainty line extends from the normalized low calculated value to the normalized high calculated value.

In optional step 622, function 600 receives at least one low reference value of uncertainty and at least one high reference value of uncertainty.

In optional step 624, function 600 calculates at least one normalized low reference value by dividing the low reference value of uncertainty by the normalization value.

In optional step 626, function 600 calculates at least one normalized high reference value by dividing the high reference value of uncertainty by the normalization value.

In optional step 628, function 600 displays at least one reference uncertainty line superimposed on the second bar. The reference uncertainty line extends from the normalized low reference value to the normalized high reference value.

It will be understood that many additional changes in the details, materials, procedures and arrangement of parts and steps, which have been herein described and illustrated to explain the nature of the invention, may be made by those skilled in the art within the principle and scope of the invention as expressed in the appended claims. Moreover, the terms "about," "substantially" or "approximately" as used herein may be applied to modify any quantitative representation that could permissibly vary without resulting in a change in the basic function to which it is related.

It should be further understood that the drawings are not necessarily to scale; instead, emphasis has been placed upon illustrating the principles of the invention.

What is claimed is:

1. A computer apparatus for creating an environmental impact model comprised of: a plurality of emission objects representing emission types, each of said plurality of emission objects comprised of:

emission properties;

a processing function which is invoked to update said emission properties in real time; wherein said processing function is invoked to perform an extrapolation function, wherein said extrapolation function populates said species impact model with at least one statistically extrapolated value pair; wherein said extrapolation function is represented by calculating a variable modifier b using the equation $$b = \frac{\sum_{i=1}^{n} x_i y_i - n x_m y_m}{\sum_{i=1}^{n} x_i^2 - n x_m^2}$$

where n is the number of value pairs from said species impact model, $x_i$ is the quantified species impact value of value pair n, $y_i$ is the emissions concentration value of value pair n, $x_m$ is the mean quantified species impact value, $y_m$ is the mean emissions concentration value; calculating a linear constant k using the equation $$k = y_m - b x_m;$$

and calculating said at least one statistically extrapolated value pair using the equation $$y = bx + k,$$

where x is the quantified species impact value of said at least one statistically extrapolated value pair, and y is the emissions concentration value linked to x and at least one species impact model comprised of value pairs wherein each of said value pairs links a quantified species impact value to an emission concentration value to represent the impact of said emission type on at least one species.

2. The computer apparatus of claim 1 wherein at least one emission type is comprised of a plurality of emitted substances.

3. The computer apparatus of claim 1 wherein said emissions concentration values are expressed in native measurement units.

4. The computer apparatus of claim 1, wherein said at least one species impact model is an array.

5. The computer apparatus of claim 1, which further is includes an interface to receive new emission properties.

6. The computer apparatus of claim 5 wherein said interface is coupled with an update processor to update multiple emission properties in real time based on said new emission properties.

7. The system of claim 6 wherein said update processor recursively updates said plurality of emission objects.

8. The computer apparatus of claim 1 which further includes a toxic equivalency model processor to identify toxic equivalent values by extracting said emissions concentration values from two or more emissions data objects.

9. The computer apparatus of claim 8, wherein said toxic equivalency model processor displays said emissions concentration values in native units.

10. The computer apparatus of claim 8 wherein each of said plurality of emission objects further includes at least one substance parameter value used as a data key.

11. The computer apparatus of claim 10, wherein at least one quantified species impact value of one of said plurality of emission objects is used as a data key to retrieve an equivalent concentration value from at least another of said plurality of emission objects.

12. The computer apparatus of claim 11, wherein said at least one substance parameter value is a static species impact value.

13. The system of claim 12, wherein said at least one substance parameter value may be modified by a user.

14. The computer apparatus of claim 1, which further includes a reliability processor configured to perform a reliability function which represents the sensitivity of a function to changes in input variables.

15. The computer apparatus of claim 14 wherein an input interface of said reliability processor receives input selected from a group consisting of a sensitivity analysis type input, a substance parameter data set P, and a sample number S, calculates a sample parameter data set $Q_S$ from said substance parameter data set P using a Markov Chain Monte Carlo algorithm, inputs said sample parameter data set $Q_S$ into a function, calculates a response data set $R_S$ using said function, calculates a mean of said response data set $R_S$, calculates a median of said response data set $R_S$, calculates a variance of said response data set $R_S$, calculates a primary variance contributor from said response data set $R_S$ using a correlation method, and outputs said mean, said median, said variance, and said primary variance contributor.

* * * * *